US012595729B2

(12) United States Patent
Jandhyala et al.

(10) Patent No.: US 12,595,729 B2
(45) Date of Patent: Apr. 7, 2026

(54) METHOD TO ASSESS RISK OF FLUID FLOW AND ASSOCIATED LONG TERM DAMAGE OF ANNULAR CEMENT

(71) Applicant: Halliburton Energy Services, Inc., Houston, TX (US)

(72) Inventors: Siva Rama Krishna Jandhyala, Houston, TX (US); Walmy Cuello Jimenez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1037 days.

(21) Appl. No.: 17/700,929

(22) Filed: Mar. 22, 2022

(65) Prior Publication Data

US 2023/0258068 A1 Aug. 17, 2023

Related U.S. Application Data

(60) Provisional application No. 63/309,101, filed on Feb. 11, 2022.

(51) Int. Cl.
*E21B 47/005* (2012.01)
*C04B 40/00* (2006.01)

(52) U.S. Cl.
CPC ........ *E21B 47/005* (2020.05); *C04B 40/0032* (2013.01); *E21B 2200/20* (2020.05)

(58) Field of Classification Search
CPC ............... E21B 47/005; E21B 2200/20; C04B 40/0032
USPC ......................................................... 703/10
See application file for complete search history.

(56) References Cited

U.S. PATENT DOCUMENTS

| | | | | |
|---|---|---|---|---|
| 6,230,804 B1* | 5/2001 | Mueller | .............. | E21B 41/0042 |
| | | | | 166/293 |
| 6,697,738 B2* | 2/2004 | Ravi | ....................... | E21B 33/14 |
| | | | | 702/6 |
| 7,133,778 B2* | 11/2006 | Ravi | ....................... | E21B 33/14 |
| | | | | 702/6 |
| 7,530,396 B1* | 5/2009 | Reddy | .................. | C04B 24/163 |
| | | | | 166/293 |
| 8,105,433 B2* | 1/2012 | Kishi | ..................... | C04B 28/02 |
| | | | | 106/800 |

(Continued)

FOREIGN PATENT DOCUMENTS

WO 2020-027834 2/2020

OTHER PUBLICATIONS

Xu et al. (Influences of Fracturing Fluid Injection on Mechanical Integrity of Cement Sheath under Four Failure Modes, MDPI, 2018, pp. 1-18) (Year: 2018).*

(Continued)

*Primary Examiner* — Iftekhar A Khan
(74) *Attorney, Agent, or Firm* — Thomas Rooney; C. Tumey Law Group PLLC

(57) ABSTRACT

Methods of the present disclosure relate to assessing and mitigating the risk of pore pressure buildup as part of designing a cement formulation. A method comprises: performing wellbore integrity analysis to provide a stress state of a cement sheath, wherein the cement sheath is a model; modifying the stress state of the cement sheath due to fluid influx through the cement sheath; comparing the modified stress state to failure properties for the cement sheath; and formulating a cement composition based on at least the modified stress state.

20 Claims, 3 Drawing Sheets

(56) References Cited

U.S. PATENT DOCUMENTS

| | | | | |
|---|---|---|---|---|
| 9,624,419 B2 * | 4/2017 | Khammar | | C09K 8/46 |
| 10,415,371 B2 * | 9/2019 | Draper | | G01N 1/08 |
| 10,450,494 B2 * | 10/2019 | Pernites | | C04B 28/04 |
| 10,620,065 B2 * | 4/2020 | Polsky | | C04B 28/04 |
| 10,655,414 B1 * | 5/2020 | Wang | | E21B 29/10 |
| 11,441,415 B2 * | 9/2022 | Pisklak | | G01N 23/223 |
| 11,577,997 B2 * | 2/2023 | Jandhyala | | C04B 28/04 |
| 2012/0205103 A1 * | 8/2012 | Ravi | | E21B 33/14 |
| | | | | 166/285 |
| 2013/0082191 A1 * | 4/2013 | Raghavan | | C09K 11/02 |
| | | | | 252/301.36 |
| 2015/0033862 A1 * | 2/2015 | Bois | | G01N 29/07 |
| | | | | 73/597 |
| 2015/0330179 A1 * | 11/2015 | James | | E21B 43/24 |
| | | | | 703/1 |
| 2016/0264840 A1 * | 9/2016 | Nelson | | C09K 8/467 |
| 2017/0009122 A1 * | 1/2017 | Funkhouser | | C04B 26/14 |
| 2017/0096874 A1 * | 4/2017 | Parsons | | E21B 33/14 |
| 2017/0130115 A1 * | 5/2017 | Ballard | | C09K 8/428 |
| 2017/0183964 A1 * | 6/2017 | Jandhyala | | E21B 49/003 |
| 2017/0205388 A1 * | 7/2017 | Thomas | | G01N 33/383 |
| 2017/0268325 A1 * | 9/2017 | Draper | | E21B 49/02 |
| 2018/0156677 A1 * | 6/2018 | Polsky | | E21B 47/005 |
| 2018/0328128 A1 * | 11/2018 | Ravi | | E21B 33/14 |
| 2019/0218445 A1 * | 7/2019 | Pernites | | C09K 8/46 |
| 2019/0367797 A1 * | 12/2019 | Morgan | | C09K 8/467 |
| 2021/0082543 A1 * | 3/2021 | Yin | | E21B 33/02 |
| 2021/0207470 A1 * | 7/2021 | Pisklak | | G01N 23/20091 |
| 2021/0324704 A1 * | 10/2021 | Jandhyala | | E21B 47/06 |
| 2022/0009835 A1 * | 1/2022 | Jandhyala | | C04B 28/04 |
| 2022/0228484 A1 * | 7/2022 | Cramer | | E21B 47/06 |
| 2022/0381110 A1 * | 12/2022 | Kunz | | E21B 33/16 |
| 2023/0055082 A1 * | 2/2023 | Jandhyala | | E21B 33/14 |
| 2023/0112008 A1 * | 4/2023 | Jandhyala | | E21B 41/0064 |
| | | | | 73/152.57 |
| 2023/0185979 A1 * | 6/2023 | Benkley | | G06F 30/13 |
| | | | | 703/1 |
| 2023/0258068 A1 * | 8/2023 | Jandhyala | | E21B 47/005 |
| | | | | 166/253.1 |

OTHER PUBLICATIONS

Backe et al. (Characterizing Curing-Cement Slurries by Permeability, Tensile Strength, and Shrinkage, SPE Drill. & Completion, Sep. 1999, pp. 162-167) (Year: 1999).*

Andrade et al. (Cement Sheath Failure Mechanisms: Numerical Estimates to Design for Long-Term Well Integrity, 2016, Journal of Petroleum Science and Engineering (2016) 682-698) (Year: 2016).*

Ramos et al. (Borehole Cement Sheath Integrity—Numerical Simulation Under Reservoir Conditions, Mecánica Computacional, 2017, pp. 193-225) (Year: 2017).*

International Search Report and Written Opinion for Application No. PCT/US2022/022730, dated Nov. 2, 2022.

Soil-Pore Fluid Analysis, Available at https://dianafea.com/manuals/d944/Analys/node460.html, Accessed Mar. 1, 2022.

* cited by examiner

200

206

202

204

203

TO JOB SITE

300

310

203

325

327

308

306

304

302

329

METHOD TO ASSESS RISK OF FLUID FLOW AND ASSOCIATED LONG TERM DAMAGE OF ANNULAR CEMENT

BACKGROUND

Pore pressure buildup is a critical load that a set annular cement may experience. It can be exerted due to the presence of a charged formation or due to intervention events in neighboring wells. Pressure can be communicated through permeable paths in cement, resulting in fluid flow to the surface. An increased pore pressure within cement can lower effective stresses and cause failure.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
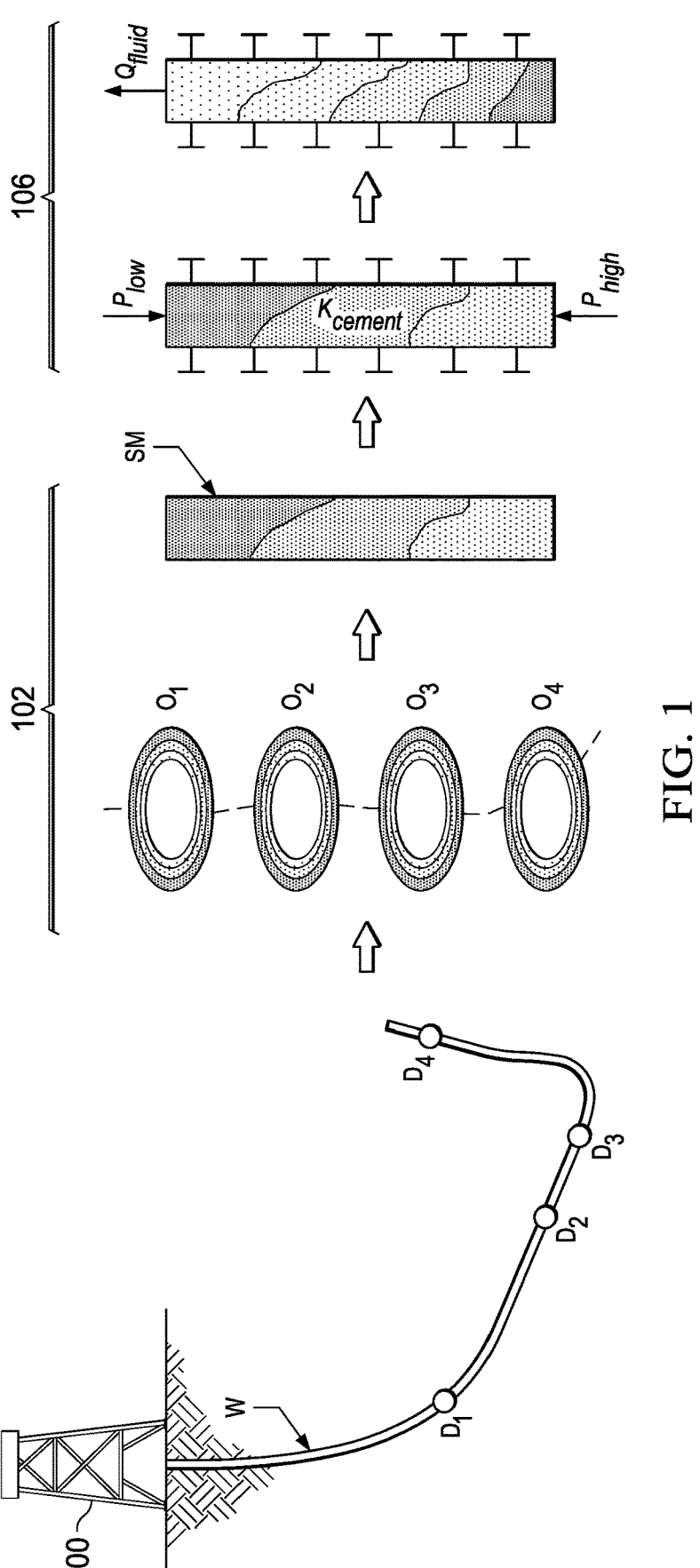
FIG. 1 illustrates a flow chart for designing a cement composition for wells experiencing cyclic loading, in accordance with examples of the present disclosure.

Methods of the present disclosure relate to assessing and mitigating the risk of pore pressure buildup as part of designing a cement formulation. This allows the ability to predict and/or assess sustained casing pressure. The methods expand the existing FEA-based wellbore integrity simulator framework to assess risk of fluid flow through a permeable annular cement and its associated mechanical failure. Finite element analysis (FEA) evaluates risk of mechanical failure of set cement sheath due to temperature and pressure loads experienced by the well over its life.

The methods use the principle of superposition of stresses. The final condition of stresses from FEA-based wellbore integrity analysis performed at multiple depths is fed as an initial stress condition for a new fluid-structure interaction analysis that will be performed only on an axial cement column using appropriate boundary conditions. The end result is a predicted stress state in the annular cement along with the fluid outflow at the top of cement.

Existing FEA-based wellbore integrity analysis assumes cement as an impermeable solid. Thus, fluid transmission through set cement and the effect of increased pore pressure in cement on its effective stress cannot be understood. Hence, limiting the ability of the model to evaluate cases such as for example, sustained casing pressure prediction due to carbon capture and sequestration (CCS) or other events.

The methods may assess risk of fluid flow through set cement; assess risk of mechanical failure due to pore pressure driven stress changes; model an entire length of a cement column with minimal computational effort; predict risk of sustained casing pressure.

In a first stage, FEA-based wellbore integrity analysis is performed at multiple depths along the well axis. This stage involves simulating a numerical model of the wellbore construction and operation processes in a thermo-structural finite element framework. Rock, cement sheath, and casing dimensions are used to create a mesh model that represents a 2D cross section of a wellbore at a desired depth. Material models of each of the components is fed to the mesh. Temperature and pressure loads are exerted on different well components at different stages of well life, such as for example, construction, pressure test, production. Outputs of the analysis are stresses and deformations of the well components. The number of analysis depths and their location can be selected to cover zones of interest. For example, the analysis depths can span across a production zone and the cap rock above, if the scope of analysis is to identify a risk of gas flow from the annulus above the cap rock.

In a second stage, three-dimensional stress state outputs of cement from the first stage are extracted, and a stress map is constructed for the entire length of the cement sheath. This may be performed by interpolations of the stresses for the zones in between two analysis depths.

In a third stage, the stress state of cement from the second stage is used. In this stage, a fluid-structure interaction analysis is performed using only the cement mesh. The cement mesh is a discretized representation of a cement material. Every node of the mesh has information of the stress and deformation experienced by that node, essentially that particular spatial location within the cement. Appropriate boundary conditions are used to compensate for the absence of rock and casing. Cement is modeled as a permeable solid in this stage. This allows for hydraulic communication through permeable cement and a subsequent accumulation of stresses, governed by the laws of poromechanics.

There are two predictions form this analysis: amount of fluid flow from the annulus at any depth of interest, and the modified stress state of a cement sheath. The modified stress state can be compared to failure properties of the cement that may include known properties such as for example, modulus of elasticity, tensile strength, elongation, hardness and/or fatigue limits, to assess risk of mechanical failure. The amount of fluid flow can be used to assess risk of fluid influx. Moreover, as the amount of fluid flow through the cement sheath increases, the resulting pressure buildup can also be assessed and regarded as predicted sustained casing pressure.

FIG. 1 illustrates a method for designing a cement composition, in accordance with examples of the present disclosure. At stage 100, FEA-based wellbore integrity analysis is performed at multiple depths $D_1$, $D_2$, $D_3$, $D_4$ along a wellbore w. This stage involves simulating a numerical model of the wellbore construction and operation processes in a thermo-structural finite element framework. Rock, cement sheath, and casing dimensions are used to create a mesh model that represents a 2D cross section of a wellbore at a desired depth. Material models of each of the components is fed to the mesh. Temperature and pressure loads are exerted on different well components at different stages of well life, such as for example, construction, pressure test, production. Outputs of the analysis are stresses and deformations of the well components. The number of analysis depths and their location can be selected to cover zones of interest. For example, the analysis depths can span across a production zone and the cap rock above if the scope of analysis is to identify risk of gas flow from the annulus above the cap rock.

During this analysis, the stress response of cement sheath is predominantly governed by loads acting in radial and azimuthal directions. Cement is assumed impermeable in this scope of analysis. This 2D plane strain framework predicts the three-dimensional stress state due to temperature (e.g., a thermo-structural response) and pressure loads by accounting for the effect of neighboring material properties and boundary conditions. Thus, the possibility of different rock types or casing types affecting the cement sheath differently is captured here. Governing equations for this stage are Hooke's law and transient thermal process of conduction.

In stage 102, three-dimensional stress state outputs $O_1$, $O_2$, $O_3$, and/or $O_4$ for the cement from stage 100 are extracted and a stress map SM is constructed for the entire length of the cement sheath. This can be done by interpolation of the stresses for the zones in between two analysis depths. Simple or complex interpolation techniques can be used.

In stage 106, a fluid-structure interaction analysis (e.g., Terzaghi's principle) is performed using only the cement mesh of the stress map. During the fluid-structure interaction analysis, rock and casing are replaced with appropriate boundary conditions. The geometry of cement is a 2D axial model. For the cement and casing edge (e.g., intersection), a lateral support boundary condition (e.g., stiffness of rock) is applied. This simulates a scenario where the stiffness of the casing is quite large compared to the cement. $P_{high}$ and $P_{low}$ are pore pressure loads above and below the cement sheath respectively. $K_{cement}$ is permeability of cement. $Q_{fluid}$ is flow rate of fluid leaking through the cement sheath.

For the cement and rock edge, two types of boundary conditions are applied. The first boundary condition is the pore pressure of rock (e.g., fluid in a rock's pore exerting a pressure on the set cement). This pore pressure can be constant or a function of time and depth depending on the scenario. The second boundary condition is a lateral support boundary condition to model a stiff rock. The rock can have a stiffness lower than or of the order of cement. By providing a lateral support on the cement-rock edge, the workflow may generate more stresses in cement vis-à-vis actual behavior. A lateral support means rock has infinite stiffness, i.e., no cushion whatsoever to the cement sheath. A lower stiffness of the rock than cement means that rock provides a cushion for cement allowing it to push the rock. Consequently, stress generated in the cement will be lower than the case of infinite rock stiffness.

From a design approach standpoint, this results in a conservative design. Due to the absence of casing and cement, computation time of stage 106 is manageable. The analysis approach used in this stage is fluid-structure interaction. Cement is modeled as a permeable solid. This allows for a possibility of pore pressure buildup in annular cement and the subsequent accumulation of stresses. The cement can be modeled with a constant permeability or with permeability changing as a function of deformation.

When the cement is modeled with constant permeability, fluid flow through permeable cement results in stress generation and deformation of cement due to pore pressure changes. The length scale of these deformations is assumed to be small such that permeability of cement remains constant. This is called one way fluid-structure interaction.

When the cement is modeled with permeability changing as a function of deformation, pore pressure changes cause enough deformations to alter the permeability of the cement. This is a two-way fluid-structure interaction where flow affects stress and vice-versa (e.g., hydraulic response).

Depending on the level of complexity desired and the magnitude of deformations, one of these two approaches can be used. These are governed by the laws of poro-mechanics. This is done by solving equations of structural mechanics simultaneously with equations of fluid flow through porous solids. The combined framework is called poro-mechanics.

There are two predictions from this analysis: amount of fluid flow from the annulus at any depth of interest, and the modified stress state of the cement sheath. The modified stress state can be compared with failure properties of cement to assess risk of mechanical failure for example via Equation 1:

$$Risk = \frac{\text{experienced shear stress}}{\text{shear strength}} \times 100 \tag{1}$$

The amount of fluid flow can be used to assess the risk of fluid influx. Typically, these are based on experience and regulatory requirements. For example, influx rate$>$=x cc/min means a high risk. Also, sustained casing pressure (SCP) is measured over the life of the well. A pressure gauged is installed in each annulus at surface and pressure is recorded/monitored over time. As pressure is observed, this is known as sustained casing pressure. Adjacent annulus pressure can also be monitored by the same mechanism. In the context of the disclosure, by assessing the quantity of fluid through the cement sheet and how much fluid is retained above top of cement (TOC) at certain pressure and temperature conditions, the pressure evolution for fluid above TOC in a closed volume system can be predicted.

The workflow of FIG. 1 may be repeated for different cement systems. Using Equation 1, a comparison of $Q_{fluid}$ and risk may occur. The cement system with the lowest $Q_{fluid}$ and lowest risk is preferred with considerations for cost, and/or material availability, for example.

Figure 2:
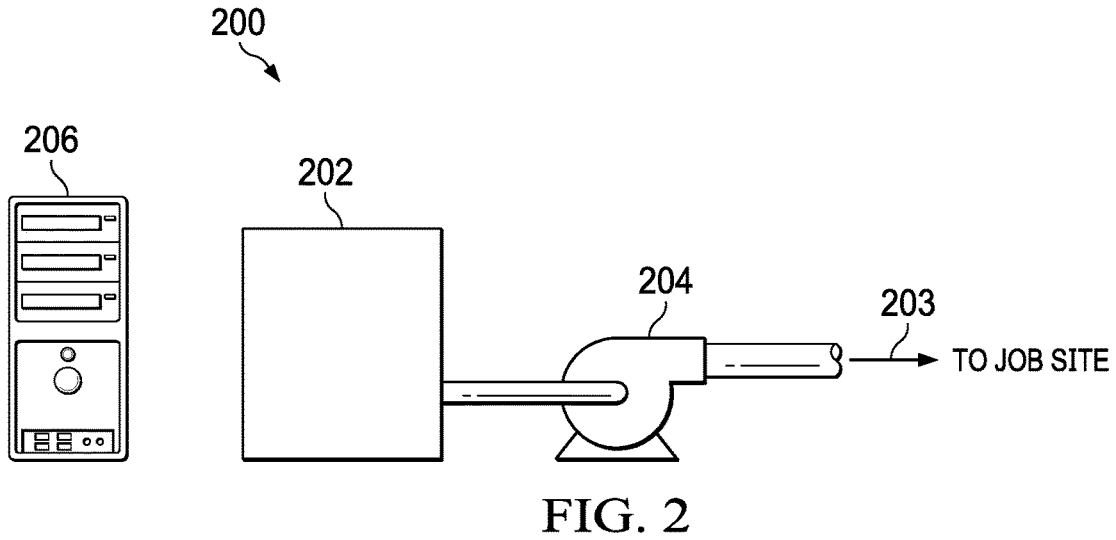
FIG. 2 illustrates a system for the preparation of a designed fluid(s) and subsequent delivery of the fluid to an application site, in accordance with examples of the present disclosure.

FIG. 2 illustrates a system 200 for the preparation of a designed fluid(s) and subsequent delivery of the fluid to an application site, in accordance with examples of the present disclosure. The system 200 may be used to formulate a cement composition that withstands the effects of pore pressure buildup such as for example, fluid flow through set cement; mechanical failure due to pore pressure driven stress changes; sustained casing pressure; and/or sustained casing pressure loads on adjacent annulus/casing configurations. To formulate the cement composition means to design the cement composition and/or create a physical cement composition based on the design (e.g., actual production of the designed cement composition).

As shown, components may be mixed and/or stored in a vessel 202. The vessel 202 may be configured to contain and/or mix the components to produce or modify a designed composition 203 (e.g., a fluid, a cement). Non-limiting examples of the vessel 202 may include drums, barrels, tubs, bins, jet mixers, re-circulating mixers, and/or batch mixers. The designed composition 203 may then be moved (e.g., pumped via pumping equipment 204) to a location.

The system 200 may also include a computer 206 for performing the workflow of FIG. 1 and to prepare the designed composition. The computer 206 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. The computer 206 may be any processor-driven device, such as, but not limited to, a personal computer, laptop computer, smartphone, tablet, handheld computer, dedicated processing device, and/or an array of computing devices. In addition to having a processor, the computer 206 may include a server, a memory, input/output ("I/O") interface(s), and a network interface. The memory may be any computer-readable medium, coupled to the processor, such as RAM, ROM, and/or a removable storage device for storing data and a database management system ("DBMS") to facilitate management of data stored in memory and/or stored in separate databases.

The computer 206 may also include display devices such as a monitor featuring an operating system, media browser, and the ability to run one or more software applications. Additionally, the computer 206 may include non-transitory computer-readable media. Non-transitory computer-readable media may include any instrumentality or aggregation of instrumentalities that may retain data and/or instructions for a period of time.

Figure 3:
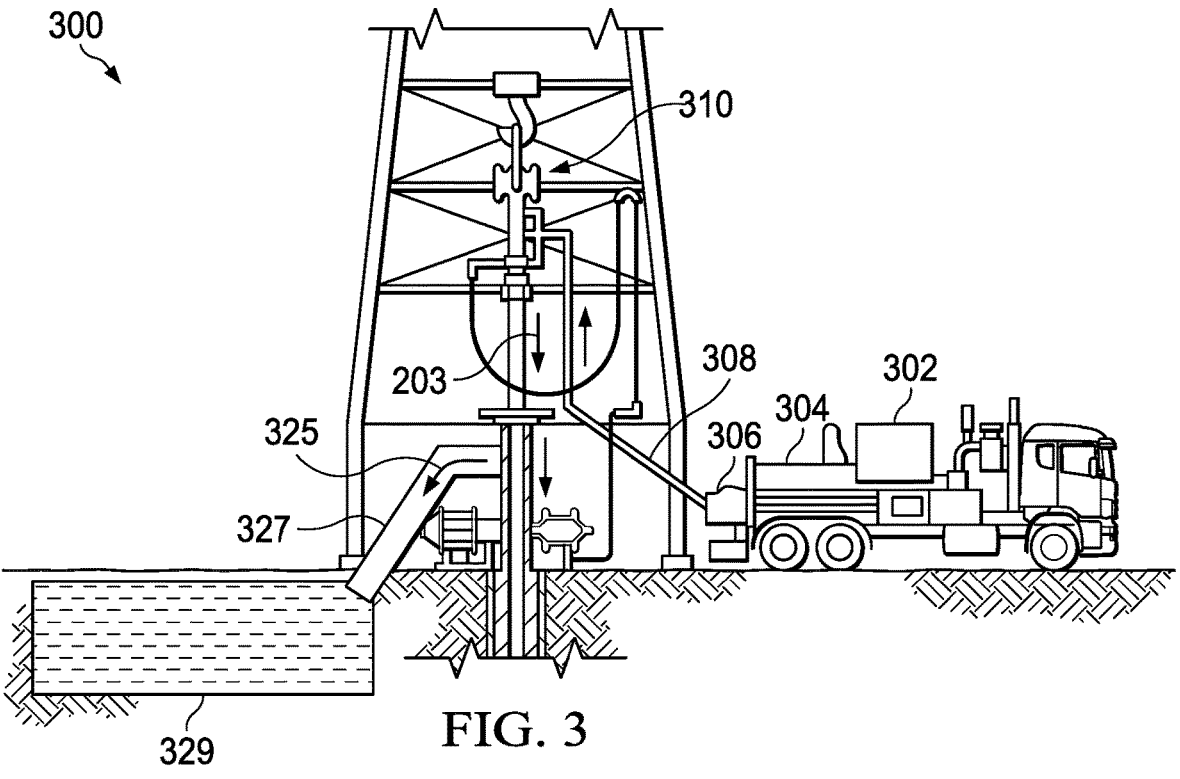
FIG. 3 illustrates a system that may be used in the placement of a cement composition, in accordance with examples of the present disclosure.

FIG. 3 illustrates a system 300 that may be used in the placement of a designed composition, in accordance with examples of the present disclosure. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure.

The system 300 may include a cementing unit 302, which may include one or more cement trucks, for example. The cementing unit 302 may include mixing equipment 304 and pumping equipment 306. The cementing unit 302 may pump the designed composition 203, through a feed pipe 308 and to a cementing head 310 which conveys the composition 203 into a downhole environment.

Figure 4:
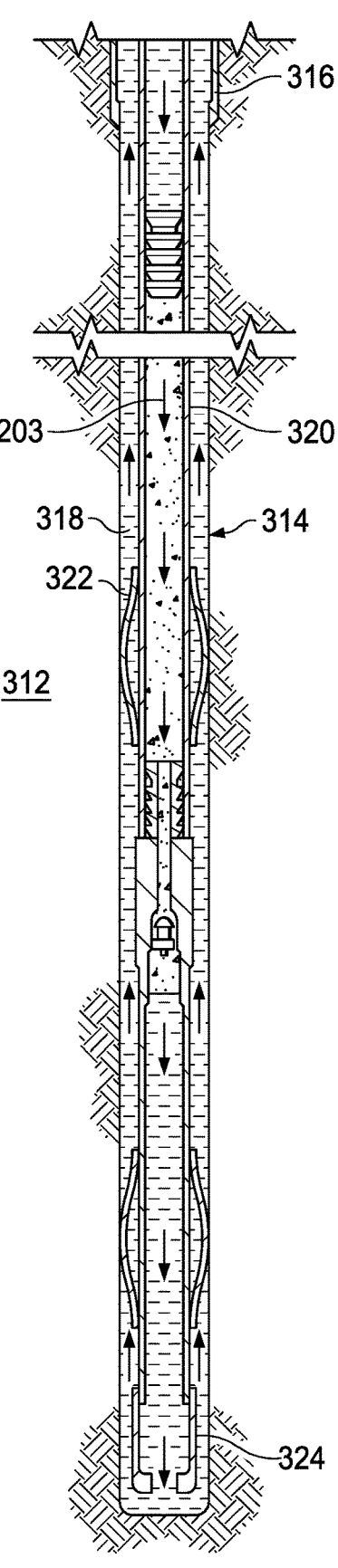
FIG. 4 illustrates the cement composition placed into a subterranean formation, in accordance with particular examples of the present disclosure.

With additional reference to FIG. 4, the composition 203 may be placed in a subterranean formation 312. A wellbore 314 may be drilled into the subterranean formation 312. While the wellbore 314 is shown generally extending vertically into the subterranean formation 312, the principles described herein are also applicable to wellbores that extend at an angle through subterranean formation 312, such as horizontal and slanted wellbores.

A first section 316 of casing may be inserted into the wellbore 314. The section 316 may be cemented in place by a cement sheath 318. A second section 320 of casing may also be disposed in the wellbore 314. A wellbore annulus 322 formed between the second section 320 and walls of the wellbore 314 and/or the first section 316.

The composition 203 may be pumped down the interior of the second section 320 of casing. The composition 203 may be allowed to flow down the interior of the casing through the casing shoe 324 at the bottom of the second section 320 and up around the second section 320 of casing into the wellbore annulus 322. As it is introduced, the composition 203 may displace other fluids 325, such as drilling fluids and/or spacer fluids that may be present in the interior of the casing and/or the wellbore annulus 322. At least a portion of the displaced fluids 325 may exit the wellbore annulus 322 via a flow line 327 and be deposited, for example, in one or more retention pits 329.

Other techniques may also be utilized for introduction of the composition 203. For example, reverse circulation techniques may be used that include introducing the composition 203 into the subterranean formation 312 via the wellbore annulus 322 instead of through the casing (e.g., section 320).

Cement slurries described herein may generally include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the cement slurry in any amount suitable for a particular composition. Without limitation, the hydraulic cement may be included in the cement slurries in an amount in the range of from about 10% to about 80% by weight of dry blend in the cement slurry. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement slurries.

The water may be from any source provided that it does not contain an excess of compounds that may undesirably affect other components in the cement slurries. For example, a cement slurry may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement slurry in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement slurry such as the hydraulic cement and supplementary cementitious materials, for example.

As mentioned above, the cement slurry may include supplementary cementitious materials. The supplementary cementitious material may be any material that contributes to the desired properties of the cement slurry. Some supplementary cementitious materials may include, without limitation, fly ash, blast furnace slag, silica fume, pozzolans, kiln dust, and clays, for example.

The cement slurry may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the cement slurry prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the cement slurry in an amount suitable for a particular application.

In some examples, the cement slurry may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement slurry may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement slurry may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the cement slurry may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement slurry. For example, without limitation, one or more supplementary cementitious materials may be present in an amount of about 0.1% to about 80% by weight of the cement slurry. For example, the supplementary cementitious materials may be present in an amount ranging between any of and/or including any of about 0.1%, about 10%, about 20%, about 30%, about 40%, about 50%, about 60%, about 70%, or about 80% by weight of the cement.

In some examples, the cement slurry may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement slurry, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement slurry in an amount in the range of from about 10% to about 100% by weight of the cement slurry, for example. In some examples, the hydrated lime may be present in an amount ranging between any of and/or including any of about 10%, about 20%, about 40%, about 60%, about 80%, or about 100% by weight of the cement slurry. In some examples, the cementitious components present in the cement slurry may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the cement slurry in several; forms, including as calcium oxide and or calcium hydroxide or as a reaction product such as when Portland cement reacts with water. Alternatively, lime may be included in the cement slurry by amount of silica in the cement slurry. A cement slurry may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement slurry. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement slurry after storing but prior to the placement of a cement slurry into a subterranean formation. In some examples, the cement slurry may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement slurry in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement slurry may further include a set retarder. A broad variety of set retarders may be suitable for use in the cement slurries. For example, the set retarder may comprise phosphonic acids, such as ethylenediamine tetra(methylene phosphonic acid), diethylenetriamine penta (methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement slurry in an amount sufficient to delay the setting for a desired time. In some examples, the set retarder may be present in the cement slurry in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement slurry may further include an accelerator. A broad variety of accelerators may be suitable for use in the cement slurries. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement slurry in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

Cement slurries generally should have a density suitable for a particular application. By way of example, the cement slurry may have a density in the range of from about 8 pounds per gallon ("ppg") (959 kg/m$^3$) to about 20 ppg (2397 kg/m$^3$), or about 8 ppg to about 12 ppg (1437. kg/m$^3$), or about 12 ppg to about 16 ppg (1917.22 kg/m$^3$), or about 16 ppg to about 20 ppg, or any ranges therebetween. Examples of the cement slurry may be foamed or unfoamed or may comprise other means to reduce their densities, such as hollow microspheres, low-density elastic beads, or other density-reducing additives known in the art.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement slurry may also, for example, support the conduit in the wellbore. In remedial cementing applications, the cement slurry may be used, for example, in squeeze cementing operations or in the placement of cement plugs. By way of example, the cement slurry may be placed in a wellbore to plug an opening (e.g., a void or crack) in the formation, in a gravel pack, in the conduit, in the cement sheath, and/or between the cement sheath and the conduit (e.g., a micro annulus).

Accordingly, the methods of the present disclosure assess and mitigate the effects of pore pressure buildup as part of designing a cement formulation. The methods may include any of the various features disclosed herein, including one or more of the following statements.

Statement 1. A method comprises: performing wellbore integrity analysis to provide a stress state of a cement sheath, wherein the cement sheath is a model; modifying the stress state of the cement sheath due to a fluid influx through the cement sheath; comparing the modified stress state to failure properties for the cement sheath; and formulating a cement composition based on at least the modified stress state.

Statement 2. The method of the statement 1, further comprising constructing a stress map of the cement sheath.

Statement 3. The method of any of the preceding statements, further comprising applying boundary conditions to replace rock and casing that are adjacent to the cement sheath.

Statement 4. The method of any of the preceding statements, further comprising adjusting permeability of the cement sheath as a function of deformation of the cement sheath.

Statement 5. The method of any of the preceding statements, wherein the cement sheath has a constant permeability.

Statement 6. The method of any of the preceding statements, wherein the boundary conditions comprise a stiffness of rock and a constant pore pressure, for the cement sheath and a rock edge.

Statement 7. The method of any of the preceding statements, wherein the rock has a stiffness lower than the cement sheath.

Statement 8. The method of any of the preceding statements, wherein the cement composition is formulated to at least minimize the fluid influx through the cement sheath.

Statement 9. The method of any of the preceding statements, further comprising pumping the cement composition into a wellbore.

Statement 10. The method of any of the preceding statements, further comprising setting the cement composition.

Statement 11. A method comprising performing wellbore integrity analysis to provide a stress state of a cement sheath, wherein the cement sheath is a model; modifying the stress state of the cement sheath due to a fluid influx through the cement sheath; comparing the modified stress state to failure properties for the cement sheath; and formulating a cement composition to minimize the fluid influx.

Statement 12. The method of any of the statement 11, further comprising constructing a stress map of the cement sheath.

Statement 13. The method of any of the statements 11-12, further comprising applying boundary conditions to replace rock and casing that are adjacent to the cement sheath.

Statement 14. The method of any of the statements 11-13, further comprising adjusting permeability of the cement sheath as a function of deformation of the cement sheath.

Statement 15. The method of any of the statements 11-14, wherein the cement sheath has a constant permeability.

Statement 16. The method of any of the statements 11-15, wherein the boundary conditions comprise a stiffness of rock and a constant pore pressure, for the cement sheath and a rock edge.

Statement 17. The method of any of the statements 11-16, wherein the rock has a stiffness lower than the cement sheath.

Statement 18. The method of any of the statements 11-17, further comprising preparing the cement composition.

Statement 19. The method of any of the statements 11-18, further comprising pumping the cement composition into a wellbore.

Statement 20. The method of any of the statements 11-19, further comprising setting the cement composition.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:

performing wellbore integrity analysis to provide a stress state of a cement sheath, wherein the cement sheath is a model;

modifying the stress state of the cement sheath due to a fluid influx through the cement sheath;

comparing the modified stress state to failure properties for the cement sheath; and formulating a cement composition based on at least the modified stress state such that the cement composition has a shear strength greater than the modified stress state;

preparing the cement composition;

pumping the cement composition into a wellbore; and setting the cement composition in the wellbore to form a set cement composition, wherein the set cement composition has the property of having shear strength greater than the modified stress state.

2. The method of claim 1, further comprising constructing a stress map of the cement sheath.

3. The method of claim 1, further comprising applying boundary conditions to replace rock and casing that are adjacent to the cement sheath.

4. The method of claim 1, further comprising adjusting permeability of the cement sheath as a function of deformation of the cement sheath.

5. The method of claim 1, wherein the cement sheath has a constant permeability.

6. The method of claim 3, wherein the boundary conditions comprise a stiffness of rock and a constant pore pressure, for the cement sheath and a rock edge.

7. The method of claim 6, wherein the rock has a stiffness lower than the cement sheath.

8. The method of claim 1, wherein the cement composition is further formulated such that the fluid influx through the cement sheath is less than a setpoint fluid influx.

9. The method of claim 1, wherein the wellbore integrity analysis is performed utilizing a two-dimensional plane strain framework governed by Hooke's law and a transient thermal process of conduction.

10. The method of claim 1, wherein performing the wellbore integrity analysis comprises creating a mesh model representing a cross-section of a wellbore based on rock, cement sheath, and casing dimensions, and applying temperature and pressure loads corresponding to the construction, pressure test, and production stages of a well life.

11. A method comprising:

performing wellbore integrity analysis to provide a stress state of a cement sheath, wherein the cement sheath is a model;

modifying the stress state of the cement sheath due to a fluid influx through the cement sheath;

comparing the modified stress state to failure properties for the cement sheath; and formulating a cement composition such that the fluid influx into a set cement composition formed from the cement composition is less than a setpoint fluid influx;

preparing the cement composition;

pumping the cement composition into a wellbore; and setting the cement composition in the wellbore to form the set cement composition, wherein the set cement composition has the property of having fluid influx into the set cement composition of less than the setpoint fluid influx.

12. The method of claim 11, further comprising constructing a stress map of the cement sheath.

13. The method of claim 11, further comprising applying boundary conditions to replace rock and casing that are adjacent to the cement sheath.

14. The method of claim 11, further comprising adjusting permeability of the cement sheath as a function of deformation of the cement sheath.

15. The method of claim 11, wherein the cement sheath has a constant permeability.

16. The method of claim 13, wherein the boundary conditions comprise a stiffness of rock and a constant pore pressure, for the cement sheath and a rock edge.

17. The method of claim 16, wherein the rock has a stiffness lower than the cement sheath.

18. The method of claim 11, wherein the wellbore integrity analysis is performed utilizing a two-dimensional plane strain framework governed by Hooke's law and a transient thermal process of conduction.

19. The method of claim 11, wherein performing the wellbore integrity analysis comprises creating a mesh model representing a cross-section of a wellbore based on rock, cement sheath, and casing dimensions, and applying temperature and pressure loads corresponding to the construction, pressure test, and production stages of a well life.

20. The method of claim 11, wherein the setpoint fluid influx is determined based on a regulatory requirement for maximum allowable sustained casing pressure (SCP).

* * * * *